Figure 4:
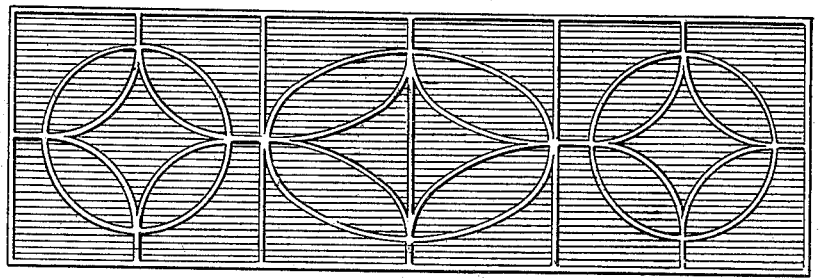

No. 695,283. Patented Mar. 11, 1902.
G. K. CUMMINGS.
METHOD OF MAKING SHEETS OR PANES OF PRISMATIC GLASS FOR USE IN MAKING PRISMATIC WINDOWS.
(Application filed Nov. 30, 1901.)
(No Model.) 3 Sheets—Sheet 1.
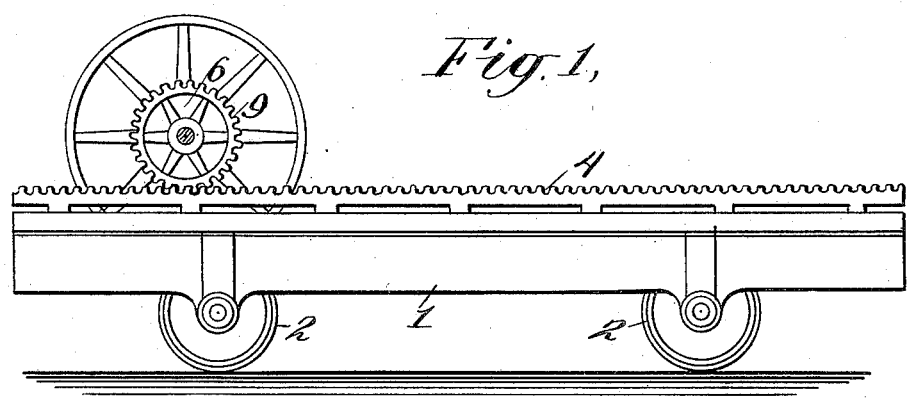
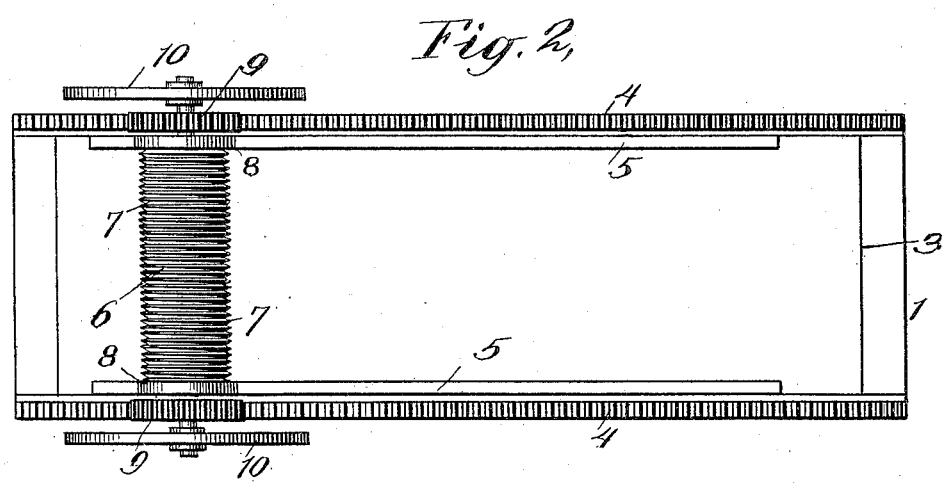
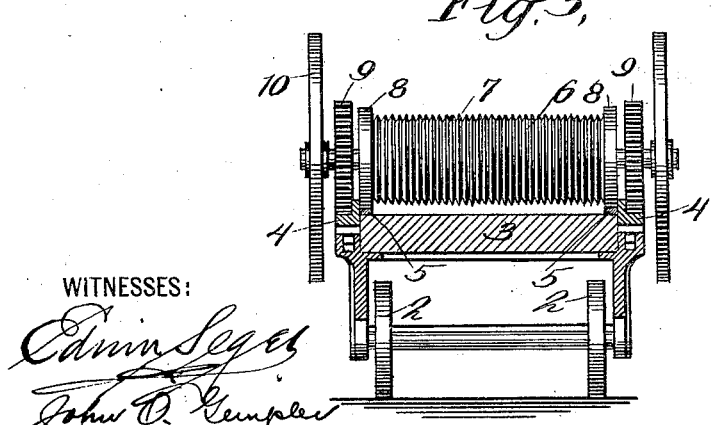

No. 695,283. Patented Mar. 11, 1902.
G. K. CUMMINGS.
METHOD OF MAKING SHEETS OR PANES OF PRISMATIC GLASS FOR USE IN MAKING PRISMATIC WINDOWS.
(Application filed Nov. 30, 1901.)
(No Model.) 3 Sheets—Sheet 2.

WITNESSES:

INVENTOR
George K. Cummings,
BY
Kenyon & Kenyon
ATTORNEYS.

No. 695,283. Patented Mar. 11, 1902.
G. K. CUMMINGS.
METHOD OF MAKING SHEETS OR PANES OF PRISMATIC GLASS FOR USE IN MAKING PRISMATIC WINDOWS.
(Application filed Nov. 30, 1901.)
(No Model.) 3 Sheets—Sheet 3.
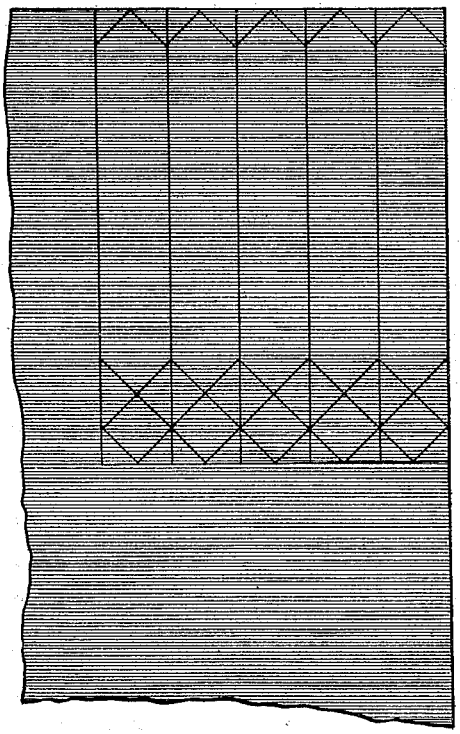
Fig. 7,
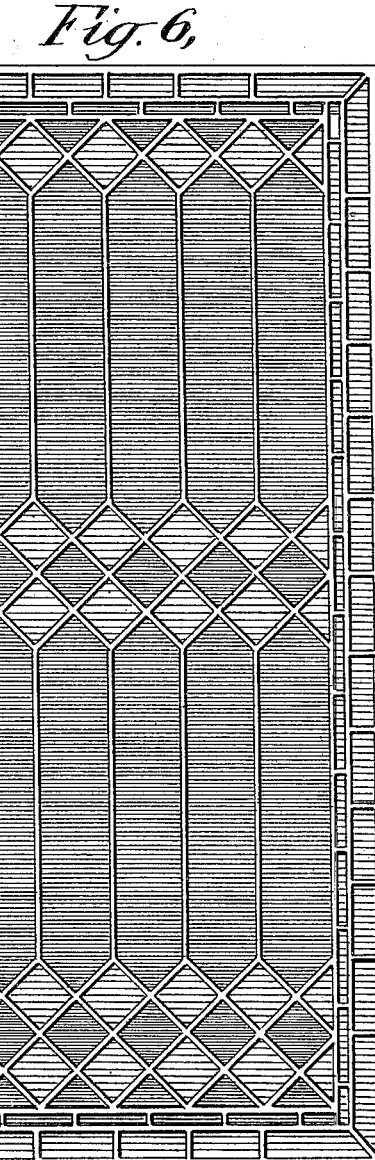
Fig. 6,
 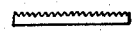
Fig. 8, Fig. 9,
WITNESSES:
Edwin Segel
John O. Gempler
INVENTOR
George K. Cummings,
BY
Kenyon & Kenyon
ATTORNEYS.
THE NORRIS PETERS CO., PHOTO-LITHO., WASHINGTON, D. C.

UNITED STATES PATENT OFFICE.

GEORGE K. CUMMINGS, OF CENTER RUTLAND, VERMONT.

METHOD OF MAKING SHEETS OR PANES OF PRISMATIC GLASS FOR USE IN MAKING PRISMATIC WINDOWS.

SPECIFICATION forming part of Letters Patent No. 695,283, dated March 11, 1902.

Original application filed August 15, 1898, Serial No. 688,578. Divided and this application filed November 30, 1901. Serial No. 84,207. (No specimens.)

*To all whom it may concern:*

Be it known that I, GEORGE K. CUMMINGS, a citizen of the United States, residing in Center Rutland, county of Rutland, and State of Vermont, have invented a new and useful Improvement in Methods of Making Sheets or Panes of Prismatic Glass for Use in Making Prismatic Windows, of which the following is a full, clear, and exact specification, reference being had to the accompanying drawings, which form a part hereof.

My invention relates to a method of making sheets or panes of glass which are provided with a series of prismatic projections on their surface, which sheets or panes of prismatic glass are adapted to be assembled and glazed together to form ornamental prismatic windows.

The object of my invention is to provide a simple and economical method of manufacturing such sheets or panes of prismatic glass, so as to enable windows to be made therefrom in any design or pattern that may be desired.

Another object of the invention is to make it possible to produce such windows of prismatic panes or sheets in a great variety of designs without necessitating great expenditure of money in making new molds and without requiring the manufacturer to carry a very large stock of prism-lights of different forms and shapes.

Another object of the invention is to enable these sheets or panes of prismatic glass to be made easily and quickly and without the aid of operators of a high degree of skill.

Another object of the invention is to make it possible to produce from the said sheets or panes of prismatic glass ornamental windows of a highly artistic character and of a superior design and finish.

My invention consists, first, in the method of making panes of prismatic glass, which consists in rolling the molten glass into a sheet having prismatic projections of the desired outline on the surface, annealing the sheet, and cutting the sheet into one or more panes of the desired outline, adapted to form the completed window when properly assembled and glazed.

The invention consists also in melting the glass until it is of the proper consistency and then stirring it before it is rolled, so as to make the mass homogeneous in temperature before it is formed into a sheet.

The invention consists also in cutting the different panes of glass out of the sheet or sheets of rolled glass in such a way that when these panes are combined or assembled together to form the finished window the prismatic projections of the different panes will be parallel with one another, whereby all the different parts of the finished window will operate to direct the rays of light that pass through it in parallel paths and will make the window entirely bright and luminous.

My invention consists also of certain other steps and features hereinafter described and claimed.

Figure 5:
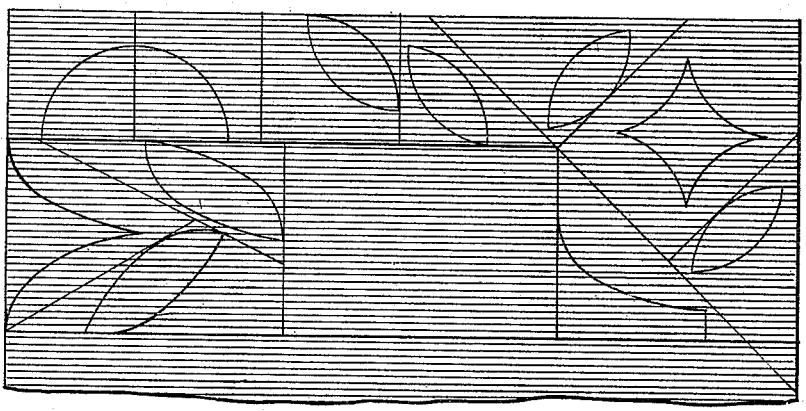

In Figures 1, 2, and 3 of the accompanying drawings I have shown an apparatus by means of which the first part of my process—to wit, the rolling of the glass—may be carried out. Fig. 1 is a side elevation of the machine. Fig. 2 is a plan view of the same. Fig. 3 is a cross-sectional view thereof. Figs. 4 to 9 illustrate the method of cutting the panes from the large sheet of rolled prismatic glass and show how they are adapted to be assembled and glazed together in the finished window. Fig. 4 represents a finished window consisting of panes of prismatic glass made according to my improved method, the finished window being designed for use as a transom or some similar purpose. Fig. 5 shows a sheet of rolled prismatic glass having applied thereto patterns of some of the separate panes required to form the window shown in Fig. 4. Fig. 6 shows another design of window consisting of panes of prismatic glass made according to my improved method, in which certain of the panes are cut from a sheet of glass having small prismatic projections on its surface and the rest of the panes are cut from another sheet of glass having larger prismatic projections on its surface. Fig. 7 shows a portion of a sheet of prismatic glass having smaller prismatic projections on its surface and having applied to its surface the patterns of some of the panes of the window shown in Fig. 6, which are made with the smaller prisms. Fig. 8 is a cross-section of a portion of the sheet having the larger prisms on its surface, and Fig. 9 is a similar section of a portion of the sheet of glass provided with the smaller prismatic projections.

In carrying out my improved method the glass is first melted by any suitable means until it is of the proper consistency. It is then stirred just before it is rolled, so as to make the mass homogeneous in temperature. It is then rolled in any suitable manner into a sheet having on its surface prismatic projections of the desired outline and arrangement. In the best form of my invention the sheet is so rolled that the prismatic projections are parallel with one another.

Any suitable mechanism or machine may be employed for rolling the glass. One form of apparatus suitable for this purpose is shown in Figs. 1 to 3, inclusive. 1 is a suitable framework, which is preferably mounted upon wheels 2, so that the machine can be conveniently moved from place to place. This framework carries the table 3, upon which the molten glass is poured and which serves to support the glass against the roller during the rolling operation. The table is provided with the racks 4 on the sides thereof. 5 5 are strips for regulating the thickness of the plate of prismatic glass which is produced by the machine. The surface of the table is plane. 6 is a roller provided with the continuous annular parallel ribs 7, which extend entirely around the roller. The plane of the ribs is parallel with the direction of motion of the roller and perpendicular to the plane of the glass plate to be formed. These ribs 7 are made to correspond in form with the depressions which it is desired to produce upon the upper side of the plate of glass. The roller is provided with a smooth bearing-surface 8 at its ends, adapted to rest and ride upon the strips 5. 9 9 are gears which are attached to the ends of the roller 6 and which are adapted to mesh with the racks 4. 10 10 are hand-wheels mounted on the ends of the roller, by means of which the roller is revolved and moved over the table 3. In carrying out my method by means of this apparatus the roller and table are first heated, so as to be brought to the proper temperature for operating upon the glass. One way of doing this is by pouring some of the molten glass preliminarily upon the roller and table until they are properly heated. The roller is moved to one end of the table and the molten glass is poured on the table in front of the roller, a sufficient quantity being supplied to the table to make a full sheet of prismatic glass. In order to make the mass of glass as nearly homogeneous as possible in temperature, it is then thoroughly stirred just before it is rolled. This can be done by any suitable means. The roller 6 is then rolled along the table, so as to roll the glass out into the form of a sheet having prismatic projections of the desired outline on its surface. These prismatic projections will be parallel with one another. The sheet of glass is then removed from the table and annealed. Any suitable form of leer or annealing-oven can be used for this purpose. It is important that the glass should be slowly and thoroughly annealed, because the sheet is irregular in cross-section, and is therefore likely to break unless annealed with the greatest care. When the sheet of glass has been thus properly annealed and cooled, it is cut up into panes of the desired or necessary outline to form the completed window. This can be done by any suitable means. In the best form of my invention I proceed as follows: The finished window is to be made up of a certain number of panes or lights. These panes may all be of the same shape and outline, but in most cases they vary in shape and it is frequently the case that a single window contains a large number of differently-shaped panes. A pattern of any suitable material is made for each pane that is to be used in forming the window. These patterns are applied to the back or plane surface of the sheet of glass in the proper position relatively to the prismatic projections and to the position and arrangement which the planes are to have in the completed window, and the separate panes are cut out in accordance therewith. The separate panes are thus adapted to be combined or assembled in accordance with the design for the completed window, and when so combined or assembled they can be fastened and held in place by any suitable form of glazing or framework. Ordinarily metallic bars are employed for the glazing of the panes, these bars being so shaped as to fit the panes and having grooves into which the edges of the panes project. This method of glazing is well known.

In one form of my invention the panes are cut out of the sheet of prismatic glass in such a manner that when the panes are assembled and combined in the completed window the prismatic projections of all the panes will be parallel with one another. As a result of this every part or pane of the completed window will tend to throw the rays of light passing through it in the same or a parallel direction, which will result in making the entire window appear bright and luminous when looked at from that direction. In Figs. 4 and 5 I have indicated how my improved method may be carried out, so as to produce a window of this kind. Fig. 4 represents the finished window which it is proposed to make. The design of the window having been first prepared, as shown in this figure, a pattern is made for each of its component panes, or one for each different shape of pane. These patterns are then applied to a sheet of rolled prismatic glass, as illustrated in Fig. 5, and the separate panes are cut out in accordance therewith, and so as to leave as small an amount of waste glass as possible. These panes are then assembled and glazed together, as shown in Fig. 4. It will be seen that the patterns in Fig. 5 are so applied to the glass plate that when the panes are cut out and properly combined and assembled the prismatic projections on the panes will all be parallel and in proper relation.

In Figs. 6 to 9 I have illustrated how my improved method can be carried out so as to produce another form of prismatic window. Fig. 6 represents the design of window which is to be produced. Some of the panes of this window have small prismatic projections and the others have larger prismatic projections, as clearly shown in the drawings. Fig. 7 represents a sheet of glass from which the panes having the smaller projections are cut. Fig. 9 is a partial cross-sectional view of this form of glass. Fig. 8 is a suitable cross-sectional view of the sheet of glass having the larger projections. The patterns for the different panes are prepared, as already explained, and applied to the two sheets of glass, respectively, and the panes are thus cut out. They are then assembled and glazed, as shown in Fig. 6. By providing some of the panes with smaller prisms and other panes with larger prisms new and beautiful effects can be produced.

Many advantages result from this invention, some of which are as follows: A practically endless variety of designs can be embodied in windows composed of panes made according to my improved method without requiring the manufacturer or maker to constantly carry on hand a large stock of prismatic lights. Where windows are made from molded panes or lights, it would be necessary for the manufacturer to maintain an immense stock of these molded plates in order to be ready to make windows in accordance with any particular design that may be ordered. Ordinarily no two windows are of the same pattern or design, but each new case requires prismatic lights of special sizes and forms. Even different sizes of the same design of window would have to be made up from a different stock of goods. No manufacturer can afford to mold the few panes that are required for each new window separately. The cost of such a method would be prohibitive. The result has been that the number and variety of designs that it has been practically possible to make from molded plates have been very limited. My improved method makes it possible to produce a window in any design and having any number or variety of prism-panes quickly and economically. After a sheet of prismatic glass has been rolled it can be cut up into panes of any shape or outline desired, it being practically as easy and as economical to produce one form as another. It follows also that the variety of designs that can be produced by my method economically and readily is practically without any limit. The prismatic glass is very easily and economically manufactured in the large sheets, and the preparation of the patterns and the cutting of the glass can be done quickly and economically.

This application is filed as a division of my pending application, Serial No. 688,578, filed August 15, 1898.

I do not herein claim the machine for rolling the sheets of prismatic glass, as I have claimed this machine in a separate application, Serial No. 681,011, filed by me on May 18, 1898.

I do not herein claim the product described in this application—that is, the prismatic window—as I have claimed the said product in the application of which this is a division—to wit, Serial No. 688,578, filed by me August 15, 1898.

What I claim as new, and desire to secure by Letters Patent, is—

1. The method of making panes of prismatic glass adapted to form prismatic windows which consists in rolling the molten glass into a sheet having prismatic projections of the desired outline on the surface, annealing the sheet, and cutting the sheet into one or more panes of the desired outline, substantially as set forth.

2. The method of making panes of prismatic glass adapted to form prismatic windows which consists in rolling the molten glass into a sheet having parallel prismatic projections of the desired outline on the surface, annealing the sheets, and cutting the sheet into one or more panes of the desired outline, substantially as set forth.

3. The method of making panes of prismatic glass adapted to form prismatic windows which consists in melting the glass until it is of the proper consistency, stirring it just before it is rolled so as to make the mass homogeneous in temperature, rolling the molten glass into a sheet having prismatic projections of the desired outline on the surface, annealing the sheet, and cutting the sheet into one or more panes of the desired outline, substantially as set forth.

4. The method of making panes of prismatic glass adapted to be assembled and glazed together to form prismatic windows which consists in rolling the molten glass into one or more sheets, having parallel prismatic projections of the desired outline on the surface, annealing the sheet or sheets, cutting the sheet or sheets into panes of the desired outline and in such a manner that when the panes are combined to form the window, the prismatic projections of all the panes will be parallel, substantially as set forth.

5. The method of making panes of prismatic glass adapted to be assembled and glazed together to form prismatic windows which consists in rolling the molten glass into one or more sheets having parallel prismatic projections of the desired outline on the surface, annealing the sheet or sheets, applying patterns of the separate panes to the sheet or sheets and cutting the panes out according to said patterns, substantially as set forth.

6. The method of making panes of prismatic glass adapted to be assembled and glazed together to form prismatic windows which consists in rolling the molten glass into one or more sheets, having parallel prismatic projections of the desired outline on the surface, annealing the sheet or sheets, applying patterns of the separate panes to the sheet or sheets in such a way that the prismatic projections of all the panes will run in a predetermined direction with reference to one another when the panes are assembled to form the window, and cutting the panes out according to said pattern, substantially as set forth.

7. The method of making panes of prismatic glass adapted to be assembled and glazed together to form prismatic windows which consists in rolling the molten glass into one or more sheets, having parallel prismatic projections of the desired outline on the surface, annealing the sheet or sheets, applying patterns of the separate panes to the sheet or sheets in such a way that the prismatic projections of all the panes will be parallel when the panes are assembled to form the window and cutting the panes out according to said patterns, substantially as set forth.

8. The method of making panes of prismatic glass adapted to be assembled and glazed together to form prismatic windows, which consists in melting the glass until it is of the proper consistency, stirring it just before it is rolled so as to make the mass homogeneous in temperature, rolling the molten glass into one or more sheets having prismatic projections of the desired outline on the surface, annealing the sheet or sheets, applying patterns of the separate panes to the sheet or sheets, and cutting the panes out according to the said patterns, substantially as set forth.

In testimony whereof I have signed my name to this specification in the presence of two subscribing witnesses.

GEORGE K. CUMMINGS.

Witnesses:
G. A. BROWN,
EDWIN SEGER.